United States Patent
Grosso et al.

(10) Patent No.: US 6,590,672 B1
(45) Date of Patent: Jul. 8, 2003

(54) MANAGING POORLY COMPRESSIBLE IMAGES IN A RESOURCE LIMITED SYSTEM

(75) Inventors: Marc Raymond Grosso, Fairport, NY (US); Craig D. Woodward, Victor, NY (US); Joseph M. Grassi, Webster, NY (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/408,372

(22) Filed: Sep. 29, 1999

(51) Int. Cl.$^7$ ............................................... G06K 15/00
(52) U.S. Cl. ...................................................... 358/1.13
(58) Field of Search ................................. 358/1.1, 1.13, 358/1.9, 1.16, 2.1, 1.17, 1.12, 1.18, 296, 538, 540; 700/32, 40, 30; 399/38, 26, 77, 85

(56) References Cited

U.S. PATENT DOCUMENTS 5,644,683 A * 7/1997 Ross et al. ................... 358/1.8
5,999,710 A * 12/1999 Smith et al. ................ 358/1.15

* cited by examiner

*Primary Examiner*—Arthur G. Evans
(74) *Attorney, Agent, or Firm*—Fay, Sharpe, Fagan, Minnich & McKee, LLP

(57) ABSTRACT

A printing system includes intelligence for balancing throughput, image quality and memory requirements. The printing system includes intelligence for determining whether to print a page in an interleaved mode or in a single page mode. Color pages containing poorly compressed color separations are printed in a single page mode so as to ensure that all of the color separations of the page may fit into the available memory and that system throughput is sufficient. The pages that are not printed in an interleaved mode are printed in a single page mode. The resolution of color data contained in a page that is to be printed in a single page mode may be reduced to fulfill system throughput and memory requirements.

22 Claims, 3 Drawing Sheets

| | | |
|---|---|---|
| CYAN | PAGE 1 | —100 |
| CYAN | PAGE 2 | —102 |
| MAGENTA | PAGE 1 | —104 |
| MAGENTA | PAGE 2 | —106 |
| YELLOW | PAGE 1 | —108 |
| YELLOW | PAGE 2 | —110 |
| BLACK | PAGE 1 | —112 |
| BLACK | PAGE 2 | —114 |

*FIG. 3*

| | | |
|---|---|---|
| CYAN | PAGE 1 | —116 |
| MAGENTA | PAGE 1 | —118 |
| YELLOW | PAGE 1 | —120 |
| BLACK | PAGE 1 | —122 |
| CYAN | PAGE 2 | —124 |
| CYAN | PAGE 3 | —126 |
| MAGENTA | PAGE 2 | —128 |
| MAGENTA | PAGE 3 | —130 |

*FIG. 4*

MANAGING POORLY COMPRESSIBLE IMAGES IN A RESOURCE LIMITED SYSTEM

TECHNICAL FIELD

The present invention relates generally to printing and more particularly to managing poorly compressible images in a resource limited system.

BACKGROUND OF THE INVENTION

Certain conventional printing systems utilize electronic precollation (EPC) memory to store print jobs that have been decomposed and compressed. EPC memory supports a "scan once, print many" printing model where a document is scanned into a system a single time and then multiple copies of the document are distributed to multiple printers for printing. EPC memory is often found in print servers or in digital front ends (DFEs).

EPC memory typically works quite well when black and white images are being printed. The memory and bandwidth requirements for printing such black and white images are not excessive. Color images encoded in accordance with a CMYK color model, however, have four-times the amount of data as black and white images. Thus, the printing of color images has posed a strain on the memory resources and computational resources of some conventional printing systems. Matters are complicated by the current trend of requiring increased throughput in conventional printing systems that use EPC memory.

SUMMARY OF THE INVENTION

The present invention addresses the above-described limitations of conventional printing systems. The present invention seeks to balance throughput requirements, memory requirements and image quality requirements. In one embodiment of the present invention, each page of a document is decomposed into four color separations. The sizes of the compressed color separations are compared to the available memory in an EPC system to determine whether sufficient memory in the EPC system is available for printing the page in an interleaved printing mode. In the interleaved printing mode, like color separations from consecutive pages are printed together. Thus, the cyan color separation from the first page is printed followed by the cyan color separation from the second page. Subsequently, the magenta color separation from the first page is printed followed by the magenta color separation of the second page. If the color separations are too large, it may be difficult to transfer the separation data quickly enough. If the size of the separation is too large, the throughput is insufficient to transfer the data in the separation in a timely fashion. This arises since the compressed color separations for the second page are also stored in the memory of the EPC system in the interleaved printing mode. For such large color separations, the page is printed in accordance with a single page printing mode where the separations for a single page are printed consecutively.

Prior to printing the page in the single page printing mode, a check is made whether the color separations of the page occupies too much memory, even when printed in accordance with the single page mode. A determination is also made whether the separation is too large to satisfy throughput requirements. If the determination indicates that the separation is too large, the page resolution is reduced, and an approach is used to reduce the amount of data stored for the page by decreasing the resolution of the data.

In accordance with one aspect of the present invention, a method is practiced in a digital color printing system that has a storage for storing pages to be printed. The storage includes memory having memory space. The system also includes an image output terminal (IOT) for producing image output. This memory holds a selected page that includes at least two color separations of distinct types containing color data. In accordance with the method, an amount of color data contained in the color separations is determined and an amount of memory space available in the memory for use in printing the selected page is determined. Based on these determinations, it is determined whether to print the selected page in an interleaved mode wherein color separations of like types from separate pages are collated together to be printed successively prior to printing other types of color separations from the separate pages.

In accordance with another aspect of the present invention, a digital color output system includes an IOT for generating output from pages containing color separations holding image data. The IOT outputs in an interleaved printing mode wherein color separations from consecutive pages are output together. The system also includes an electronic precollation (EPC) system for storing image data prior to outputting and for passing input data to the IOT for outputting. The EPC system has a memory with a quantity of available memory space. The system also includes a mode selector for selecting whether a selected page is output in the interleaved printing mode based on how much image data is contained in the color separations of the selected page and the quantity of available memory space in the memory of the EPC primary storage.

BRIEF DESCRIPTION OF THE DRAWINGS

An illustrative embodiment of the present invention will be described below relative to the following drawings.

FIG. 3 illustrates an example of the interleaved printing mode.

FIG. 4 illustrates an example of a single page printing mode.

DETAILED DESCRIPTION OF THE INVENTION

The illustrative embodiment of the present invention identifies poorly compressible images and processes these poorly compressible images so as to ensure they do not exceed memory requirements and do not jeopardize required throughput in a digital printing system. For each page of a document to be printed, the illustrative embodiment checks compressed color separations in the page for size and required throughput. In particular, the illustrative embodiment calculates the space requirements in primary memory of an EPC system for an uncompressed color separation. A single page threshold value is also calculated using the uncompressed separation size, the time required to load a color separation from secondary memory to primary memory in the EPC system, and the time required to print a color separation as parameters.

If the size of a color separation in a page exceeds the single page threshold value, the single page printing mode is used rather than the interleaved printing mode. The use of the single page printing mode ensures that all of the color separations for the page may be co-resident in the primary memory, such as RAM, of the EPC system. If a page is to be printed using the single page printing mode, a final check is made to determine whether the desired throughput rate is achievable given the size of the page. The page may be reduced in resolution in order to be printed so as to ensure the desired throughput rate.

The illustrative embodiment provides an approach where a page can be guaranteed to print in a finite resource system having throughput requirements and limited primary memory in the EPC system. The illustrative embodiment identifies poorly compressible images and adapts to facilitate the printing of such images. The illustrative embodiment balances multiple related interests to produce a result that strikes a reasonable balance between these interests.

Figure 1:
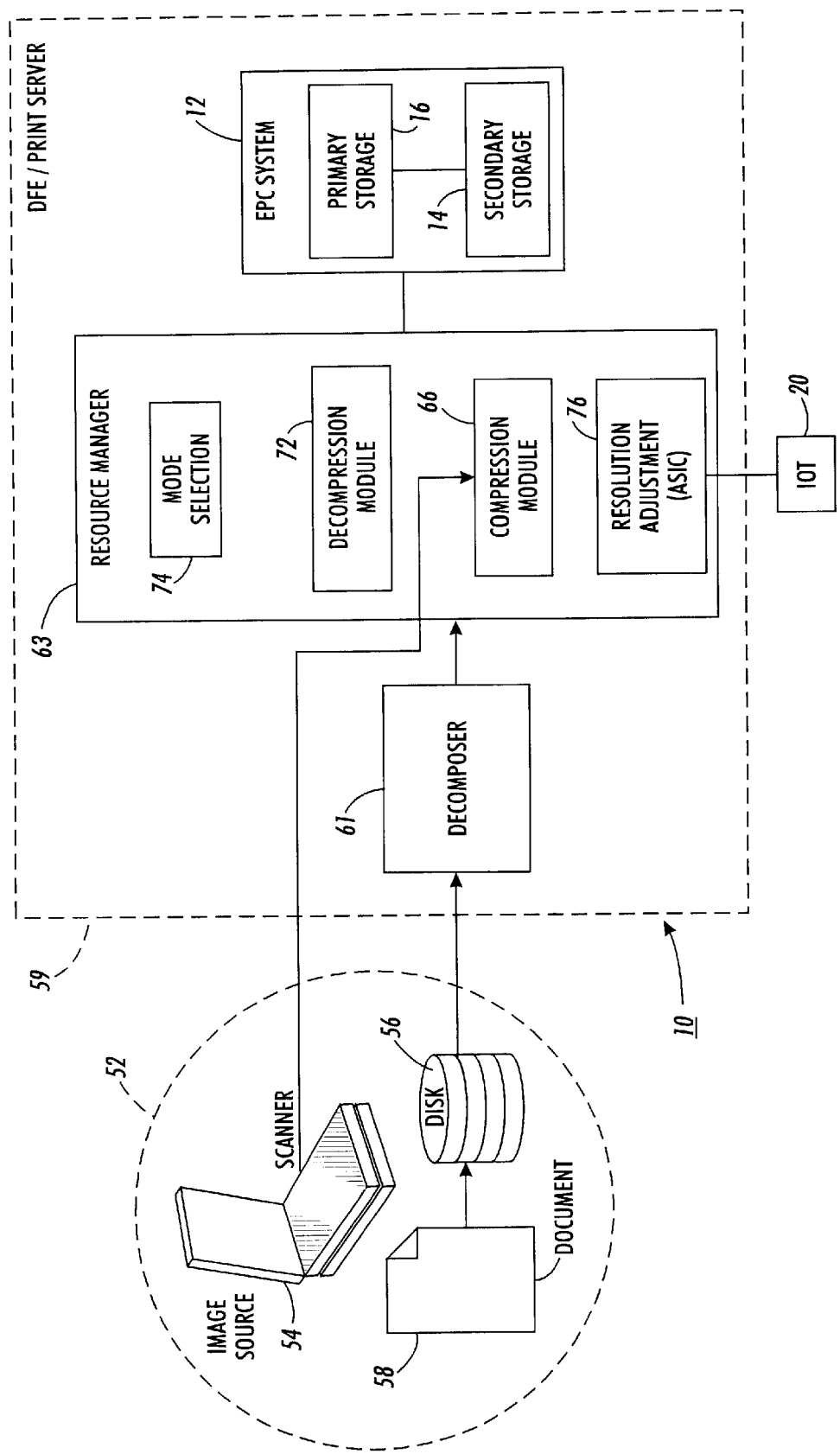
FIG. 1 is a block diagram of a printing system suitable for practicing the illustrative embodiment of the present invention.

FIG. 1 depicts a digital printing system 10 that is suitable for practicing the illustrative embodiment of the present invention. The digital printing system 10 includes an image source 52 that provides an image of a document 58 in digital form to a digital front end (DFE) or print server 59. The image source 52 may be a digital scanner 54 that scans and digitizes the document 58 or a secondary storage device 56, such as a magnetic disk or an optical disk, on which the document 58 is stored. Those skilled in the art will appreciate that other image sources may be utilized in practicing the present invention. For example, the image source 52 may be a remote computer, a digital camera or other hardware device.

When the document 58 originates from the secondary storage device 56, the pages of the document 58 are encoded in a page description language, such as Postscript or PCL. A decomposer 61 is responsible for interpreting page description language commands contained within the pages of the document 58 and generating a decomposed version of each of the pages containing four color separations: cyan, magenta, yellow and black. The decomposer 61 may be, for example, a Postscript interpreter. The color separations are passed to a compression module 66 within a resource manager 63. When the document 58 originates from the scanner 54, there is no need to decompose the document and, as such, the document 58 passes directly to the compression module 66.

The resource manager 63 manages access to the EPC system 12. The resource manager 63 contains the compression module 66, which compresses the color separations for storage on the EPC system 12. A number of different types of compression algorithms may be utilized to compress the color separations. For example, Lempel-Ziv compression algorithms, such as LZ77, LZ78 or LZW, may be utilized. Moreover, various run length encoding techniques and Huffman encoding techniques may be utilized. Those skilled in the art will appreciate that the choice of compression algorithm may be dictated by the application and environment in which the compression is performed.

As the separations of the document 58 are compressed, the compressed data for the separations is passed to the EPC system 12. The EPC system 12 includes secondary storage 14 and a primary storage 16. The secondary storage device 14 may be, for instance, a magnetic disk storage, an optical disk storage or other secondary storage device. The primary storage 16 acts as a cache and may be implemented using random access memory (RAM). However, those skilled in the art will appreciate that other types of memory devices may be utilized to implement the primary storage 16. The compressed color separations are stored in the secondary storage 14. When it is time to print a page of the document, the compressed color separations for the page are passed from the secondary storage 14 to the primary storage 16 onto a decompression module 72 that decompresses the color separations. A mode selector 74 determines whether the page is to be printed in the interleaved printing mode or in the single page printing mode, and a resolution adjustment module 76 determines whether the resolution of the page needs to be adjusted downward in order to satisfy throughput requirements and memory requirements of the digital printing system 10. The page is then passed to an IOT 20 for output. In the illustrative embodiment, it is presumed that the IOT 20 includes a Xerox print engine produced by Xerox Corporation of Stamford, Conn. Nevertheless, other types of print engines may be used.

Figure 2:
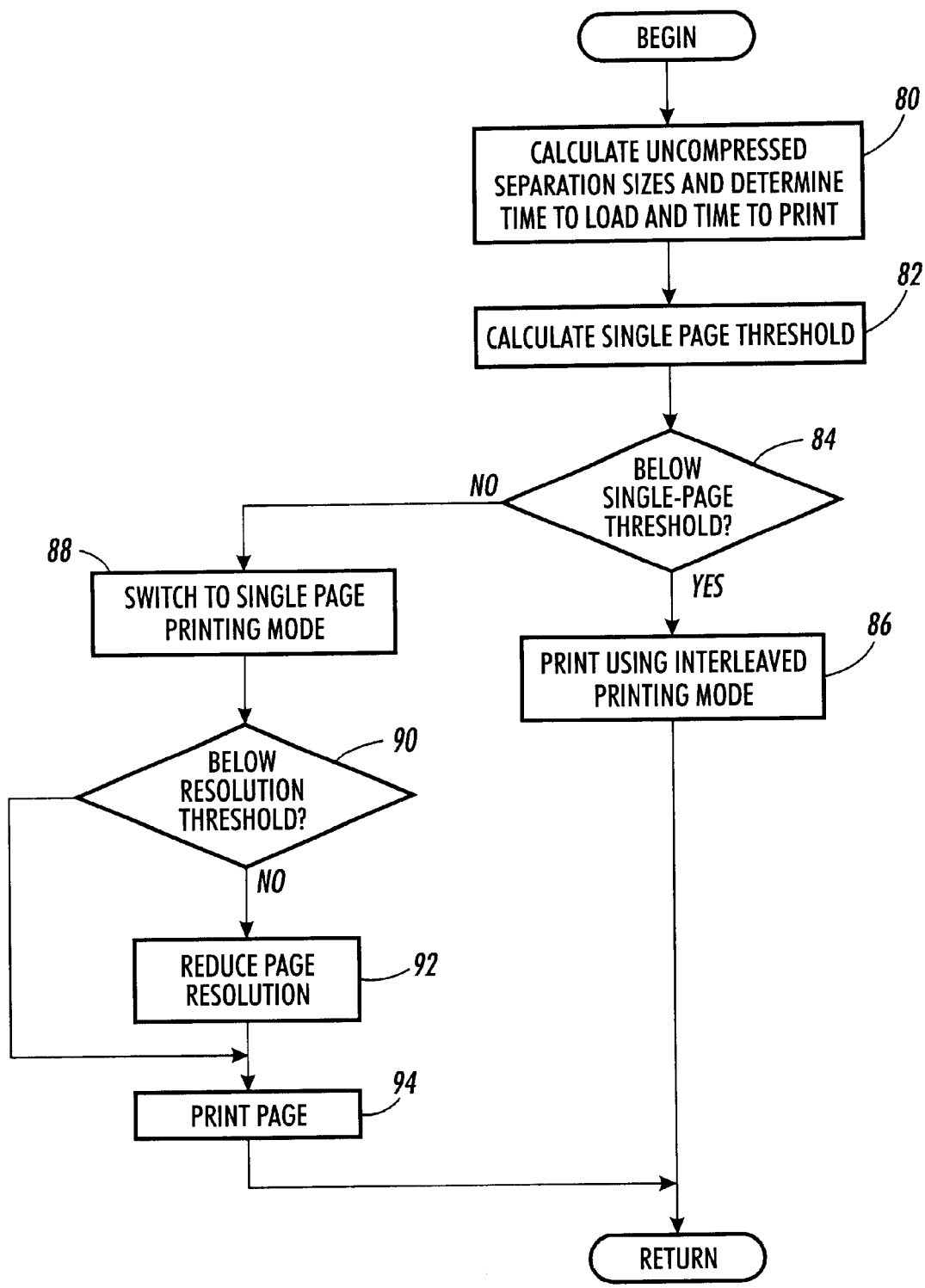
FIG. 2 is a flow chart illustrating the steps that are performed to identify poorly compressible images and to process the poorly compressible images to satisfy memory and throughput requirements.

FIG. 2 is a flow chart illustrating the steps that are performed by the mode selector 74 and the resolution adjustment module 76 while processing a page of the document 58. Each of the pages of the document is processed in this fashion. In order to appreciate the operations performed by the mode selector 74, it is helpful to briefly review the two printing modes that are available in the illustrative embodiment.

FIG. 3 illustrates an interleaved printing mode wherein color separations for consecutive pages are collated together in the primary storage 16 of the EPC system 12 for printing. The color separations are placed into the primary memory device 14 in the specified sequence for outputting to the IOT 20. The IOT 20 prints the color separations in the sequence depicted, starting with the color separation 100 and ending with the color separation 114. As shown in FIG. 3, the color separation 100 is a cyan color separation for one page of the document, and is collated with the color separation 102, which is the cyan color separation for another adjacent page of the document. Similarly, the color separations 104 and 106 are collated, as are the color separations 108 and 110 and the color separations 112 and 114.

The interleaved printing mode is faster than the single page printing mode for the IOTs in this system. The printing of a color document requires four passes wherein each pass is associated with a given color separation. The transition between passes can be time-consuming. By collating together like type color separations from consecutive pages, the interleaved printing mode saves time in printing color pages of a color document. The drawback, however, is that the interleaved printing mode spreads the color separations for a single page throughout the primary memory 16 of the EPC system 12. Thus, the data transfer rate from secondary storage 14 may be insufficient to allow the separations to be printed in a timely fashion.

FIG. 4 depicts the single page printing mode. In the example depicted in FIG. 4, color separations 116, 118, 120 and 122 are collated in consecutive order and represent the color separations for a single page (i.e. "page 1"). These color separations are followed by the color separations 124 and 126 and the color separations 128 and 130 that are output in an interleaved printing mode.

Initially, the mode selector 74 calculates the uncompressed separation sizes for the color separations of a page and determines the time required to load each separation and the time required to print each separation (step 80 in FIG. 2). For each color separation in a page, the bytes per uncompressed separation are calculated to determine the uncompressed separation size. The uncompressed separation sizes are useful to determine how much space is required for an uncompressed separation in primary memory. The bytes per uncompressed separation are calculated as follows:

$$\text{bytes per uncompressed separation} = (\text{width} * \text{height} * \text{depth} * x\text{-resolution} * y\text{-resolution})/8$$

The width refers to the width of the page in inches, and height refers to the height of the page in inches. Depth refers to the number of bits that are used to represent color for each pixel, x-resolution refers to the resolution in dots per inch (DPI) in the x dimension (presuming that the page extends along an x-axis and y-axis), and y-resolution refers to the resolution in the y direction. The value within the parenthesis in the above-equation specifies the total number of bits in the separation. This value is divided by eight to calculate the number of bytes per uncompressed separation.

An example is helpful to illustrate the calculation of the bytes per uncompressed separation. Suppose that a color separation includes 16 pixels and that the color separation holds color data for 16 pixels as follows:

| 1 | 0 | 0 | 1 |
|---|---|---|---|
| 1 | 1 | 0 | 0 |
| 1 | 1 | 0 | 0 |
| 0 | 0 | 0 | 1 | where:
 width=4.
 height=4.
 depth=1.
 x-resolution=1.
 y-resolution=1.
In such a case, bytes per uncompressed separation= (width*height*depth*x-resolution*y-resolution)/8=(4×4× 1×1×1)/8=16/8=2.

A second example illustrates the effect of increasing the depth to two bits per pixel. In the second example, suppose that the 16 pixels have color data for color separation with the following values:

| 11 | 00 | 11 | 00 |
|----|----|----|----|
| 11 | 11 | 01 | 10 |
| 10 | 01 | 11 | 00 |
| 11 | 10 | 10 | 10 | where:
 width=4.
 height=4.
 depth=2.
 x-resolution=1.
 y-resolution=1.
For this second example, bytes per uncompressed separation=(4*4*2*1*1)/8=32/8=4.

The mode selector 74 then calculates a "single page threshold" value for compressed separation size (step 82 in FIG. 2). If the compressed size of a color separation exceeds the single page threshold (see step 84 in FIG. 2), the single page printing mode is used to print the page (step 88 in FIG. 2).

In order to appreciate the meaning of the single page threshold it is useful to illustrate how the single page threshold is calculated. The single page threshold is calculated as follows:

$$\text{single page threshold} = (\text{time to load separation}/\text{time to print separation}) * (\text{bytes per uncompressed separation}).$$

The "time to load separation" refers to the time it takes to load a color separation from the secondary storage device 14 to the primary storage device 16 in the EPC system 12. The "time to print separation" refers to the time it takes for the IOT 20 to print the color separation after the color separation is loaded into the primary storage 16.

The single page threshold calculation balances the time to load from the secondary storage device 14 to the primary storage device 16 relative to the time it takes to remove the data from the primary storage device. The ratio in the calculation is multiplied by the uncompressed separation size, which constitutes a measure of the amount of data to be transferred. The single page threshold represents a maximum size for a color separation that is permitted given the throughput requirements represented by the time to load separation and time to print separation values.

If each color separation in the page is below the single page threshold (see step 84 in FIG. 2), the page may be output using the interleaved printing mode (step 86 in FIG. 2).

In an instance where the single page printing mode is used (see step 82 in FIG. 2), a check is made whether it is necessary to reduce the resolution of the page prior to printing the page. In making this decision, the illustrative embodiment calculates a resolution reduction threshold. The compressed image page size is compared to the resolution reduction threshold (step 90 in FIG. 2), and if the expressed image page size is greater than the resolution reduction threshold, the page resolution is reduced by the resolution adjustment module 76 (step 92 in FIG. 2). The resolution adjustment module 76 may be an application specific integrated circuit (ASIC) that decreases the resolution of the color data by dropping its four pixels uniformly within the color separations of a page. Alternatively, the resolution module 76 may be implemented in software.

If the compressed page size is below the resolution reduction threshold (see step 90 in FIG. 2), the page is printed using a single page printing mode (step 94 in FIG. 2). Likewise, if the compressed image size is greater than the resolution reduction threshold, the page is printed using the single page printing mode after the resolution has been adjusted (see step 94 in FIG. 2).

The resolution reduction threshold is calculated as follows:

$$\text{resolution reduction threshold} = (((\text{time to print page})/\text{cached}/EPC \text{ throughput rate}) * \text{cached}) + \text{size of } EPC\ RAM.$$

where:
 time to print page=the sum of the times to print the color separations in the page.
 EPC throughput rate=the number of bytes of data that can be read from the secondary storage device 14 in a second.
 size of EPC RAM=maximum number of bytes in the primary memory device 16.
 cached=((sum of all compressed color separations in the page)−size of EPC RAM).

While the present invention has been described with reference to an illustrative embodiment thereof, those skilled in the art will appreciate that various changes in form and detail may be made without departing from the intended scope of the present invention as defined in the appended claims. For example, a DFE or print server need not be used in practicing the present invention. The resource manager and EPC subsystem may be incorporated into an output device, such as a printer.

What is claimed is:

1. In a digital color printing system having memory, which includes memory space, for storing pages to be printed and an image output terminal (IOT) for producing image output, a method, comprising the steps of:

providing a selected page in the memory, wherein the selected page includes at least two color separations of distinct types containing color data;

determining an amount of color data contained in the color separations;

determining an amount of memory space available in the memory for use in printing the selected page; and based on the determined amount of color data in the separations and the determined amount of memory space available in the memory, determining whether to print the selected page in an interleaved printing mode wherein color separations of like types from separate pages are collated together to be printed successively prior to printing other types of color separations from the separate pages.

2. The method of claim 1 wherein if it is determined that the amount of color data contained in the separations is too large for throughput from the memory, the method further comprises the step of determining to print the selected page in a mode other than the interleaved printing mode.

3. The method of claim 2 further comprising the step of printing the selected page in a single page printing mode wherein the color separations of the selected page are printed successively without interleaved color separations from other pages.

4. The method of claim 1 wherein the step of providing the selected page in the memory comprises the step of providing the selected page in the memory in compressed form.

5. The method of claim 1 wherein the step of providers to selected in the memory comprises the step of providing the selected page in the memory in uncompressed form.

6. The method of claim 1 further comprising the step of reducing resolution of the color data in the color separations in the selected page.

7. The method of claim 6 further comprising the step of reducing the resolution of the color data in the color separations in the selected page when it is determined that the selected page is not to be printed in the interleaved printing mode.

8. The method of claim 7 further comprising the step of reducing the resolution of the color data in the color separations in the color page when sizes of the color separations exceed a threshold.

9. A digital color output system, comprising:

an image output terminal (IOT) for generating output from pages containing color separations holding image data, said IOT outputting in an interleaved printing mode wherein color separations from consecutive pages are output together;

an electronic precollation (EPC) system for storing image data prior to outputting and for passing image data to the IOT for outputting, said EPC system including memory having a quantity of available memory space; and a mode selector for selecting whether a selected page is output in the interleaved printing mode based on how much image data is contained in the color separations of the selected page and throughput from the EPC system.

10. The digital color output system of claim 9 further comprising a resolution adjustment mechanism for reducing resolution of image data in a given page.

11. The digital color output system of claim 10 wherein the resolution adjustment mechanism is an ASIC.

12. The digital color output system of claim 10 wherein the resolution adjustment mechanism is implemented in software.

13. The digital color output system of claim 9 wherein the memory in the EPC system includes both a primary memory device and a secondary memory device.

14. The digital color output system of claim 9 wherein the IOT is a printer.

15. The digital color output system of claim 9 wherein the EPC system and the mode selection module are part of a print server.

16. The digital color output system of claim 9 wherein the EPC system and the mode selection module are part of a digital front end.

17. The digital color output system of claim 16 wherein the digital front end also includes a resolution adjustment mechanism for reducing resolution of image data in a given page.

18. In a digital color printing system having a memory with memory space for storing pages to be printed, including a selected page having at least two color separations of distinct types containing color data, and an image output terminal (IOT) for producing image output, a medium for holding instructions for performing a method, comprising the steps of:

determining an amount of color data contained in the color separations;

determining an amount of storage space available in the memory for use in printing the selected page; and based on the determined amount of color data in the separations and the determined amount of memory space available in the cache, determining whether to print the selected page in an interleaved printing mode wherein color separations of like types from separate pages are collated together to be printed successively prior to printing other types of color separations from the separate pages.

19. The medium of claim 18 wherein if it is determined that the amount of color data contained in the separations is too large for the determined amount of memory space available in the memory, determining to print the selected page in a mode other than the interleaved printing mode.

20. The medium of claim 19 wherein the method further comprises the step of printing the selected page in a single page printing mode wherein the color separations of the selected page are printed successively without interleaved color separations from other pages.

21. The medium of claim 18 wherein the color separations of the selected page are printed successively without interleaved color separations from other pages.

22. The medium of claim 19 wherein the method further comprises the step of reducing resolution of the color data in the color separations in the selected page.

* * * * *